Figure 1:
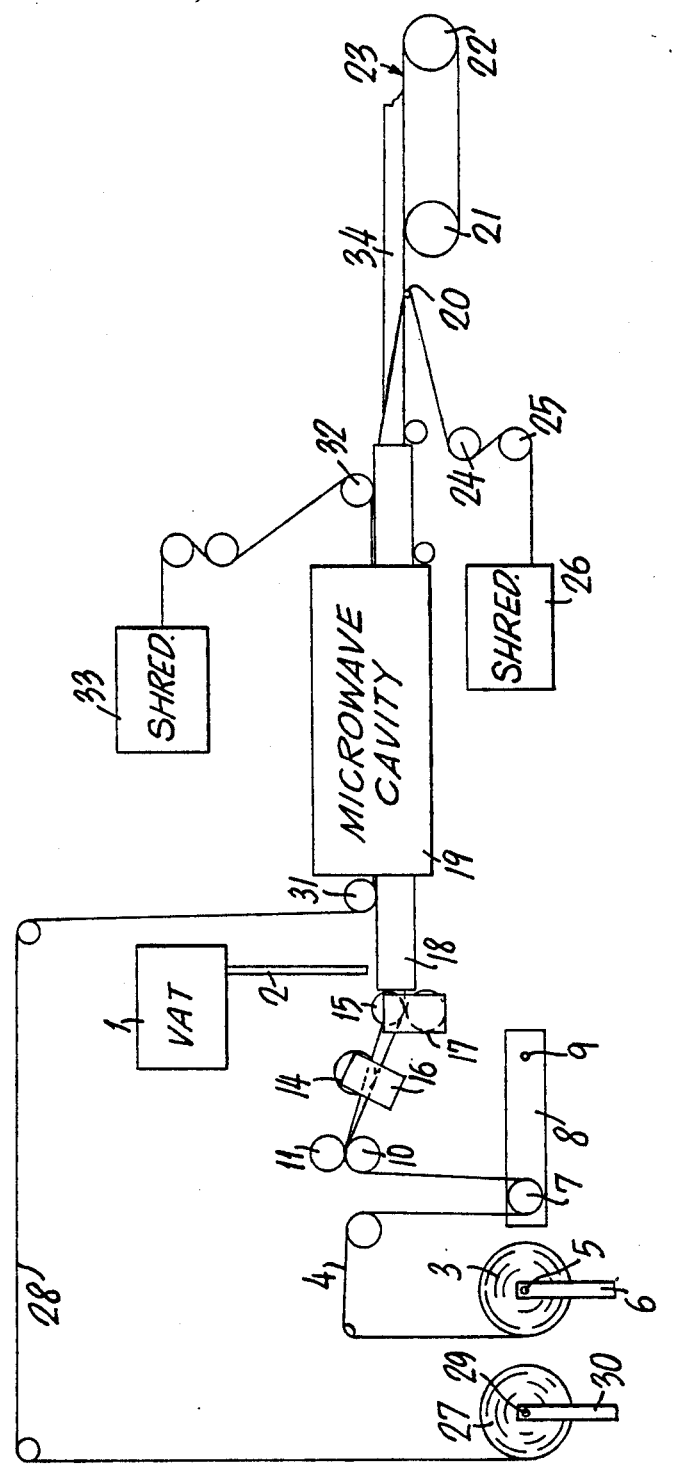

United States Patent [19]

Hauton et al.

[11] Patent Number: 4,940,866
[45] Date of Patent: Jul. 10, 1990

[54] AN INSTALLATION FOR THE SHAPING OF A CONTINUOUS FOOD PRODUCT WHILE IT IS HARDENING

[75] Inventors: Francois Hauton, Villeneuve La Garenne; Frédéric Dumas, Lomme; Franck Bouttemy, Achicourt; Christian Huc, Arras, all of France

[73] Assignee: OV'Action S.A., Lievin, France

[21] Appl. No.: 288,296

[22] Filed: Dec. 22, 1988

[30] Foreign Application Priority Data

Aug. 3, 1988 [FR] France ................... 8810764

[51] Int. Cl.$^5$ .............................. H05B 6/78
[52] U.S. Cl. ...................... 219/10.55 A; 219/10.55 E; 219/388; 426/243; 99/443 C; 99/451; 99/353
[58] Field of Search ............ 219/10.55 A, 10.55 R, 219/10.55 M, 388, 10.55 E; 99/483, 443 R, 443 C, 432, 451, DIG. 14, 353; 426/512, 515, 517, 243, 241

[56] References Cited

U.S. PATENT DOCUMENTS

| | | | |
|---|---|---|---|
| 3,795,183 | 3/1974 | Roth et al. | 99/353 |
| 3,900,574 | 8/1975 | Warwick | 426/515 |
| 3,961,569 | 6/1976 | Kenyon et al. | 99/451 |
| 3,994,215 | 11/1976 | Rabeler | 99/353 |
| 4,075,359 | 2/1978 | Thulin | 426/517 |
| 4,441,003 | 4/1984 | Eves, II et al. | 219/10.55 A |
| 4,530,849 | 7/1985 | Stanley et al. | 99/353 |
| 4,554,865 | 11/1985 | Caridis et al. | 99/353 |
| 4,697,507 | 10/1987 | Nagasaki | 99/443 C |

FOREIGN PATENT DOCUMENTS 2181936 5/1987 United Kingdom.

Primary Examiner—Philip H. Leung
Attorney, Agent, or Firm—Shenier & O'Connor

[57] ABSTRACT

A system for shaping a food product which is initially in the liquid state, such as fresh liquid egg white or yolk, while it is hardening, in which the liquid product is fed to a continuously unwinding band of flexible material, such as Teflon-coated paper which is deformed while in motion from a flat state to the shape of a continuous container and in which the product is treated as by heating until it is hard. After the product is hard the band is restored to its flat state and is drawn in a direction opposite to its original direction while the shaped and hardened product is carried away. Specifically, the means for deforming the band comprises a pair of press rollers having male and female molding parts for marking longitudinal folding lines on the band and flanges for raising the edges of the bands along the longitudinal folding lines. Preferably, the product is heated in a microwave cavity and, during heating, a second band is applied on top of the shaped band to form a steam-tight cover.

11 Claims, 3 Drawing Sheets

AN INSTALLATION FOR THE SHAPING OF A CONTINUOUS FOOD PRODUCT WHILE IT IS HARDENING

The present invention relates to the shaping and cooking of industrial food products which are in the form of a continuous strip which is to be cut to the desired length and, if appropriate, to the desired width.

French patent No. 2.589.046 has disclosed a device for shaping and cooking an industrial food product, comprising a conveyor equipped with heating means, and cutting means. The liquid food product is deposited on the conveyor in the form of a film by means of an extrusion nozzle, the conveyor having been oiled beforehand. Gelling of the food product takes place when the liquid product comes into contact with the conveyor, which is heated to a temperature of the order of 50 to 80° C., and by steam being blown onto the top part of the product until the required hardness is obtained. Thus the finished product retains the shape which it had on leaving the extruder, i.e. the shape of a film. Furthermore, the conveyor and the cutting means are constantly impregnated with oil to prevent the food product from sticking.

Thus, with the known device mentioned above, it is impossible to make products which have any shape other than that of a sheet. Moreover, the presence of oil can have an adverse effect on the taste properties of certain products.

A process for the shaping of a continuous food product while it is hardening has now been found which overcomes the above-mentioned disadvantages, and it is this which forms the subject of the invention. According to the invention, the process consists in:
 (a) causing a flexible support band to move continuously in a first given direction, from a first so-called feed zone to a second so-called demolding zone, and then in a second direction, opposite to the first direction, to a third so-called discharge zone,
 (b) deforming the said band transversely so that it forms a continuous container whose cross-section corresponds to the shape desired for the finished product, and feeding the food product in the liquid state into the shaped band in the feed zone,
 (c) treating the product, upstream of the demolding zone, until it hardens, and
 (d) in the demolding zone, flattening the band again before it is drawn in the second direction, opposite to the first, towards the discharge zone, and carrying the cooked food product in the first direction.

The treatment usually consists in heating the product.

To obtain the simplest shape, the transverse deformation of the band consists in producing two longitudinal folds on the band, which are parallel and equidistant from each of the two borders of the band, and in raising the edges of the band to give the latter a U-shaped cross-section.

Advantageously, during the heating operation, the top part of the shaped band is covered with a covering means impermeable to steam. Preferably, a second band of a material impermeable to steam is applied, which moves continuously in an identical fashion to the first support band and is positioned above the said support band in the manner of a cover.

In a preferred application of the process, the food product is fresh liquid egg white or yolk and heating consists in raising the liquid egg to a sufficient temperature to coagulate it.

A further object of the invention is to protect an installation specially designed for carrying out the above-mentioned process. The installation is of the known type in that it comprises means for feeding the liquid food product and heating means. According to the invention, with the feeding means located in a first so-called feed zone and the heating means located between the feed zone and a second so-called demolding zone, the installation comprises:
 (a) a continuous and flexible support band provided with first means of displacement capable of moving the said band in a first given direction, from the feed zone to the demolding zone, and with second means of displacement capable of moving the said band in a second direction, opposite to the first, from the demolding zone to a third so-called discharge zone,
 (b) means for deforming the band and keeping the band in shape while it moves from the feed zone to the demolding zone, and
 (c) means for moving the hardened food product in the first direction.

The support band is preferably a band of paper whose side in contact with the food product has a nonstick coating, for example made of polyethylene.

The deformation means consist, for example, of:
 (a) two press-rollers which have, along at least two directrices, in one case an overthickness forming a male molding part and in the other case a recess, facing the overthickness, forming a female molding part,
 (b) means for guiding the band, which are located so that the folds formed on the band by the molding parts of the press-rollers are parallel to the edges of the band and in the desired arrangement, and
 (c) bearing means which are located along the path of the band and on each side thereof, downstream of the pressrollers, and are capable of raising the edges of the band.

The means for moving the band in the second direction, opposite to the first, consist, for example, of a guide rod over which the band passes in the demolding zone, and of a reception means located underneath the band and downstream of the guide rod in the second direction, the said reception means drawing the band so that it bears on a large part of the periphery of the guide rod.

In particular, if it is desired that the hardened food product should have a very regular surface state, the installation preferably includes a second continuous band of a material impermeable to steam, which is provided with means of displacement capable of moving the said second band in the first direction and positioning the said second band above the first support band while it moves through the heating means, so as to form a cover.

The heating means consist, for example, of a microwave cavity, the first and second bands are made of materials inert to microwaves and the means for keeping the first band in shape comprise a rod made of a material inert to microwaves and having a hollow longitudinal relief whose internal profile corresponds to that of the shaped band. For example, the retaining rod will consist of a U-shaped assembly of quartz bars.

Figure 2:
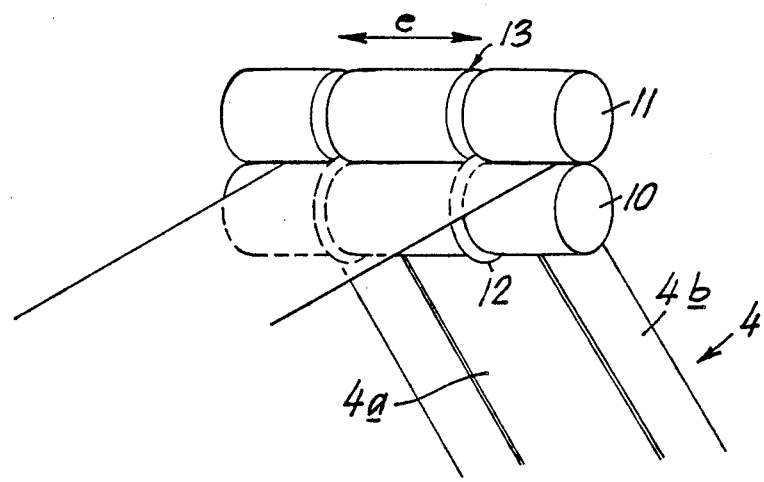
Figure 3:
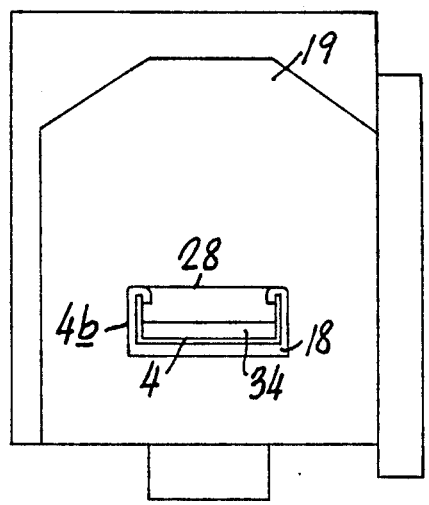

The invention will be understood more clearly, and further objects, advantages and characteristics thereof will become more clearly apparent, from the description which now follows, illustrated by the attached drawing; in this drawing:

FIG. 1 is a schematic side view of an embodiment of the installation according to the invention, FIG. 2 is a schematic perspective of the deformation means, and FIG. 3 is a cross-section view of the microwave cavity.

The installation which will be described is intended for the shaping and cooking of a food product based on egg white. The vat 1, fixed in the top part of a frame (not shown), is equipped with a stirrer and is thermostated so as to keep the fresh liquid egg white which it contains at a temperature below 10° C. The liquid egg comes from breakers where the eggs are broken, the whites being separated from the yolks, homogenized and kept at a low temperature of the order of 4° C. so as to ensure good keeping properties. Of course, it is possible to add ingredients such as salts and spices to the liquid egg. The vat 1 is equipped with a feed pipe 2.

In front of the frame, at the left-hand end in FIG. 1, a spool 3, forming a reel for the band of paper 4, is fitted over the rotating axle 5 of the spool support 6.

The band of paper 4 has a width of about 162 mm. On its side facing away from the spool 3, the paper is coated with polyethylene, limiting the impregnation of the paper by the liquid egg white.

The band 4 is supported and drawn by a set of rollers fixed to the frame. Among these, the roller 7 regulates the tension of the band 4 while it is in motion. The two ends of the rotating axle of this roller 7 are mounted on bearings fixed to arms 8 pivoting about a horizontal axis 9. If appropriate, counter-weights are mounted, on the arms 8 or on an axle joining the two arms 8, at the end opposite to the pivoting axis 9.

The two press-rollers 10 and 11 have parallel and horizontal axes of rotation. They rotate in opposite directions and bear against one another. Along two directrices separated by a distance e, i.e. 121 mm, the lower roller 10 has two overthicknesses 12, each one having a triangular cross-section running around the whole periphery of the roller. Facing the two overthicknesses 12 on the roller 10, the upper roller 11 has two recesses 13 whose shape complements that of the said overthicknesses 12. Thus, when the two rollers 10 and 11 are caused to rotate, the overthicknesses 12 on the roller 10 fit into the recesses 13 in the roller 11.

The rollers 14 and 15, located along the path of the band 4, have a width equal to the separation e above. Flanges 16 and 17 are provided on either side of the rollers 14 and 15 respectively, the first flange 16 being oblique relative to the horizontal and the second flange 17 being vertical.

Referring now to FIG. 3, a quartz rod 18 is fixed horizontally to the frame, immediately downstream of the roller 17 and longitudinally relative to the band 4. It passes through the microwave cavity 19, which is supplied by generators (not shown). The rod 18 has a U-shaped cross-section, the internal recess having a width slightly greater than the separation e and a height equal to at least half the difference between the width of the band 4 and the separation e. The top part of the arms of the U preferably has an extension turned down towards the inside of the U, which is capable of preventing the raised edges of the band from folding in towards the central part.

In alignment with the rod 18 and downstream thereof, the rod 20 is located transversely relative to the band 4 and, immediately behind the rod 20, the rotating roller 21 supports, together with the roller 22, a conveyor belt 23.

Two guide rollers 24 and 25 are located underneath the downstream part of the rod 18, in the direction of motion of the band 4, together with a device 26 for shredding the band 4.

In front of the frame, even further to the left than the spool support 6, a spool 27, forming a reel for the band of paper 28, is fitted over the rotating axle 29 of the spool support 30.

The band of paper 28 is of the same type as the first band 4. Due to the polyethylene coating, it is impermeable to steam. The band 28 is supported and drawn by a set of rollers fixed to the frame. Among these, the rollers 31 and 32 are located transversely relative to the hollowed rod 18, and just above the latter, at the inlet and outlet respectively of the microwave cavity 19. Another shredding device, 33, is associated with the band 28.

During operation of the installation, the first band of paper 4 is unwound from the spool 3 to the shredding device 26. It passes successively over the tension roller 7, between the press-rollers 10 and 11 and through the microwave cavity 19. On leaving the spool 3, the band 4 is flat. When it passes between the press-rollers 10 and 11, the male and female molding parts, namely the overthicknesses 12 and the recesses 13, produce two longitudinal marks in the band 4, which are parallel to the borders of the band and separated from one another by the distance e, i.e. 121 mm. Means for guiding the band 4 are provided for centering the band 4 exactly relative to the molding parts.

The flanges 16 raise the edges 4b of the band 4, while the roller 14 keeps the central part 4a of the band 4 horizontal. Similarly, the flanges 17 bring the edges 4b vertical relative to the central part 4a.

The band 4, in this U-shaped configuration, is then supported by the internal part of the hollowed rod 18.

The band 4 passes flat over the rod 20 and is drawn by the traction rollers 24 and 25 towards the shredding device 26. The traction rollers here are stainless steel rollers whose surface is furnished with nails so that the band 4, anchored on these nails, is drawn uniformly over its whole width. It is seen that, between the downstream end of the rod 18 and the rod 20, the edges 4b of the band 4 are no longer held in the vertical position and they twist until their initial position is restored.

The installation operates in the following manner. The fresh liquid egg white, stored in the vat 1, is sent into the container formed by the U-shaped band 4.

The feed rate of the liquid egg depends on the cross-section of the desired finished product and on the speed of travel of the band 4, which itself depends on the power of the microwave radiation. In a specific example, the flow rate of the liquid egg was 0.21 l/min for a speed of travel of the band 4 of 0.3 m/min and a power at the microwave generators of 1.2 kW.

The liquid egg contained in the band 4 coagulates when the latter passes through the cavity 19. The band 28 takes up a position above the top part of the rod 18 and forms a cover which is substantially impermeable to the steam created when the liquid egg is heated. This particular arrangement permits a reduced loss of steam and a better presentation of the surface of the upper face of the finished product 34 leaving the cavity.

On leaving the microwave cavity 19, the second band 28 is sent towards the shredding device 33; the finished product 34 is a continuous bar of coagulated egg white which has not yet been completely cooked hard; it is flexible but its consistency is such that it remains in the shape given to it by the band 4, i.e., in the present example, with a rectangular cross-section 121 mm wide and 6 mm high. Between leaving the rod 18 and passing over the rod 20, the edges 4b of the first band 4, which were vertical, are flattened and the finished product 34 passes on the conveyor belt 23 towards another work station, where the product 34 is to undergo other treatments, for example cutting to the desired length and, if appropriate, cutting across its width by appropriate means. When it passes over the rod 20, the band 4 undergoes a very large change of angle, of the order of 120° to 170°, relative to its initial direction; this sudden change in direction enables the finished product 34 to separate perfectly from the band 4. After it has passed over the rod 20, the band 4 is sent towards the shredding device 26.

The invention is not limited only to the embodiment which has now been described, but covers all the variants thereof. The heating means can be more traditional means, for example infrared, steam or a water bath; in this case, the material of which the band 4 is made, and its path through the said heating means, will be defined accordingly. The product may be shaped differently so that its cross-section is other than rectangular, for example triangular, by producing a single longitudinal folding mark in the middle of the band 4 and raising the edges accordingly. In the above example, once the band 4 has been used, it is shredded and hence wasted; it may be possible for it to be re-used through an appropriate spooling arrangement, or even for the band to form an endless loop and return towards the inlet of the installation after it has passed over the rod 20. Finally, the product is not uniquely fresh liquid egg, but can be any product initially in a substantially liquid state and capable of taking up the shape of the container in which it is placed, and hardens, after an appropriate treatment, especially heating, so that it keeps its shape after demolding.

We claim:

1. An installation for the shaping of a continuous food product while it is hardening as it moves from a feed zone to a demolding zone including in combination
   a continuous flexible support band,
   means for moving said support band,
   means for guiding said moving support band along a first path portion extending in a first direction from said feed zone toward said demolding zone and along a second path portion extending in a second direction away from said demolding zone toward a discharge zone,
   means for feeding the food product in the substantially liquid state to said band in said feed zone,
   means for deforming the band and for keeping the band in deformed condition as it moves from the feed zone to the demolding zone,
   means located between said feed zone and said demolding zone for heating said product to cause said product to harden
   and means for moving hardened food product along a third path portion extending in said first direction from said demolding zone.

2. An installation as in claim 1 in which said band is paper, said paper having a non-stick coating on the side thereof which receives said food product.

3. An installation as in claim 2 in which said non-stick coating is tetrafluoroethylene polymer.

4. An installation as in claim 2 in which said means for deforming said band comprises:
   (a) two press rollers, one of which has an annular boss forming a male molding part and the other one of which has an annular recess forming a female molding part,
   (b) means for guiding the band into said press rollers so that folds formed in the band by the molding parts of the press rollers are parallel to the edges of the band, and
   (c) bearing means located along the respective sides of the band path downstream of the press rollers for raising the edges of the band.

5. An installation as in claim 2 in which said guide means comprises a guide rod over which said band passes in said demolding zone between the first and second path portions and reception means located underneath the band and downstream of the guide rod in the second direction to direct the band around a large portion of the periphery of the guide rod.

6. An installation as in claim 2 including a second continuous band of material impermeable to steam, and means for feeding said second band in said first direction and positioning said second band above the first band as it moves through said heating means whereby the second band functions as a cover.

7. An installation as in claim 2 in which said means for deforming said first band comprises:
   (a) two press rollers, one of which has an annular boss forming a male molding part and the other one of which has an annular recess forming a female molding part
   (b) means for guiding the first band into said press rollers so that folds formed in the first band by the molding parts of the press rollers are parallel to the edges of the first band, and
   (c) bearing means located along the sides of the first band path downstream of the press rollers for raising the edges of the first band to provide a shaped first band;
   said installation including a second continuous band of a material impermeable to steam and means for feeding said second band in said first direction and positioning said second band above the first band as it moves through said heating means whereby the second band functions as a cover;
   and wherein the heating means comprises a microwave cavity, the materials of said first and second bands being inert to microwaves and said bearing means comprise a rod which has been hollowed out longitudinally according to a profile corresponding to said shaped first band.

8. An installation as in claim 1 in which said means for deforming said band comprises:
   (a) two press rollers, one of which has an annular boss forming a male molding part and the other one of which has an annular recess forming a female molding part,
   (b) means for guiding the band into said press rollers so that folds formed in the band by the molding parts of the press rollers are parallel to the edges of the band, and (c) bearing means located along the respective sides of the band path downstream of the press rollers for raising the edges of the band.

9. An installation as in claim 1 in which said guide means comprises a guide rod over which said band passes in said demolding zone between the first and second path portions and reception means located underneath the band and downstream of the guide rod in the second direction to direct the band around a large portion of the periphery of the guide rod.

10. An installation as in claim 1 including a second continuous band of a material impermeable to steam, and means for feeding said second band in said first direction and positioning said second band above the first band as it moves through said heating means whereby the second band functions as a cover.

11. An installation as in claim 1 in which said means for deforming said first band comprises:
   (a) two press rollers, one of which has an annular boss forming a male molding part and the other one of which has an annular recess forming a female molding part
   (b) means for guiding the first band into said press rollers so that folds formed in the first band by the molding parts of the press rollers are parallel to the edges of the first band, and
   (c) bearing means located along the sides of the first band path downstream of the press rollers for raising the edges of the first band to provide a shaped first band;
said installation including a second continuous band of a material impermeable to steam and means for feeding said second band in said first direction and positioning said second band above the first band as it moves through said heating means whereby the second band functions as a cover;
and wherein the heating means comprises a microwave cavity, the materials of said first and second bands being inert to microwaves and said bearing means comprise a rod which has been hollowed out longitudinally according to a profile corresponding to said shaped first band.

* * * * *

UNITED STATES PATENT AND TRADEMARK OFFICE
CERTIFICATE OF CORRECTION

PATENT NO. : 4,940,866
DATED : July 10, 1990
INVENTOR(S) : Francois Hauton, Frederic Dumas, Franck Bouttemy, Christian Huc It is certified that error appears in the above-identified patent and that said Letters Patent is hereby corrected as shown below:

On the title page:

The first name of Inventor Dumas is hereby corrected to read -- Frederic --.

Signed and Sealed this

Eighth Day of October, 1991

*Attest:*

HARRY F. MANBECK, JR.

*Attesting Officer*     *Commissioner of Patents and Trademarks*